US006287627B1

(12) United States Patent
Binder et al.

(10) Patent No.: US 6,287,627 B1
(45) Date of Patent: Sep. 11, 2001

(54) METHOD FOR PRODUCING POURABLE METHIONINE SALT BASED ANIMAL FOOD SUPPLEMENT AND THE GRANULATE THUS OBTAINED

(75) Inventors: Wolfram Binder, Rodenbach; Hans A. Hasseberg, Gründau; Heidemarie Kniesel, Hösbach; Martin Körfer, Johannisberg, all of (DE)

(73) Assignee: Degussa AG, Frankfurt am Main (DE)

( * ) Notice: Subject to any disclaimer, the term of this patent is extended or adjusted under 35 U.S.C. 154(b) by 0 days.

(21) Appl. No.: 09/382,782

(22) Filed: Aug. 25, 1999

Related U.S. Application Data

(63) Continuation of application No. PCT/EP98/00515, filed on Jan. 31, 1998.

(30) Foreign Application Priority Data

Feb. 25, 1997 (DE) .............................................. 197 07 380

(51) Int. Cl.$^7$ ....................................................... A23K 1/22
(52) U.S. Cl. ............................ 426/656; 426/69; 426/807
(58) Field of Search ................................... 426/656, 807, 426/69

(56) References Cited

U.S. PATENT DOCUMENTS

| | | | | |
|---|---|---|---|---|
| 4,181,709 | * | 1/1980 | Dannelly | 424/21 |
| 5,278,329 | * | 1/1994 | Anderson | 556/50 |
| 5,290,560 | * | 3/1994 | Autant et al. | 424/438 |
| 5,300,318 | * | 4/1994 | Pierre et al. | 427/212 |
| 5,456,927 | | 10/1995 | Vinci | 426/74 |
| 5,532,008 | * | 7/1996 | Sasaoka et al. | 426/73 |
| 5,720,970 | * | 2/1998 | Rode et al. | 424/438 |
| 5,744,178 | * | 4/1998 | Ikeda et al. | 426/2 |

FOREIGN PATENT DOCUMENTS

| | | |
|---|---|---|
| 43 08 498 A1 | 9/1994 | (DE) . |
| 2153199 * | 8/1995 | (GB) . |

OTHER PUBLICATIONS

Patent Abstracts of Japan, C–271, 1985, vol. 9, No. 66: JP59–199670 (A).
Database WPI Section Ch, Week 8115 Derwent Publications Ltd., London, GB; AN 81–261060 XP002069060 & JP 56 015 834 A (Sumitomo Chem Co Ltd) & Patent Abstract of Japan vol. 5, No. 62 (C–952), Apr. 25 1981.
Database WPI Section Ch, Week 9241 Derwent Publications Ltd., London, GB; AN 92–337741 XP002069061 & JP 04 244 056 A (Sumitomo Chem Co Ltd.).
Database WPI Section Ch, Week 8809 Derwent Publications Ltd., London, GB; AN 88–058362 XP002069062 & ES 8 800 09 A (Norel SA).

* cited by examiner

*Primary Examiner*—Chhaya D. Sayala
(74) *Attorney, Agent, or Firm*—Pillsbury Winthrop LLP

(57) ABSTRACT

The invention relates to a method for producing a pourable, methionine salt based animal food supplement which is easy to handle, wherein a granulated product is manufactured from a methionine salt solution which can be obtained according to traditional methods. The invention further relates to methioninate granulated products that are thus obtained.

20 Claims, 1 Drawing Sheet

METHOD FOR PRODUCING POURABLE METHIONINE SALT BASED ANIMAL FOOD SUPPLEMENT AND THE GRANULATE THUS OBTAINED

This application is a continuation of PCT/EP98/00515 filed Jan. 31, 1998.

FIELD OF THE INVENTION

The invention relates to a process for preparing a free-flowing, easy to handle animal feed supplement based on a methionine salt in which a granulated product is obtained starting from a methionine salt solution obtained in a conventional manner and the methioninate granular products obtained therefrom.

BACKGROUND OF THE INVENTION

Methionine and aqueous solutions of methionine salts, in particular sodium methioninate (DE 31 05 009 C), but also substitutes such as the methionine hydroxy analogue (MHA) are used all over the world as feed additives for rearing poultry, pigs and other economically useful animals and mainly promotes the production of animal protein. With regard to the increasing population of the world and increasing nutritional problems, methionine, as one of the essential amino acids in the animal growth process, and its different forms, and thus also its cost effective production, are very important. Solid or liquid forms may be preferred, depending on the requirements.

Commercially available sodium methioninate solution has a concentration of 40 wt. % methionine and its biological value corresponds to that of solid methionine, in contrast to the substitute MHA, compared on an equimolar basis. There are several suitable methods for preparing these types of sodium methioninate solutions, e.g.:

1. Dissolution of isolated methionine in caustic soda solution.
2. Alkaline hydrolysis of 5-(β-methylmercaptoethyl)-hydantoin with NaOH and/or $Na_2CO_3$.
3. Alkaline hydrolysis of methionine amide.

Although method 1 provides the purest product it is more costly and thus less economic than the production of methionine itself, due to an additional process step in comparison to production of the solid. In contrast, methods 2 and 3 are used at an earlier point in the production of methionine and thus there is no need to isolate the solid during the production of DL-methionine, depending on capacity.

The preparation of 5-(β-methylmercaptoethyl)-hydantoin is performed in a known manner by direct synthesis from the conventional starting materials methylmercaptopropionaldehyde (MMP) and hydrocyanic acid in the presence of ammonia and carbon dioxide. Methionine amide is prepared in a known manner by hydrolysis of methionine nitrile, which again is obtained by direct synthesis from the conventional starting materials MMP, hydrocyanic acid or ammonium cyanide and ammonia.

Depending on special requirements, it may be expedient to use a solid or a liquid form of the animal feed supplement.

The decision about which form to produce depends, inter alia, on the mixing apparatus which is available and the specific preferences of the particular manufacturer.

When preparing mixed feeds, the different feedstuffs and additives are initially present as separate components which, depending on their characteristics, are prepared by milling, shredding, drying or purifying. If the separate components have the characteristics required, the actual mixing process is performed in a mixing unit suitable for this process. Individual mixed batches differ, depending on the size of the unit. The essential amino acid methionine is used as a supplement for mixed feeds in concentrations of the order of magnitude of 0.01 to 1.0 wt. %. These amounts are added directly to the mixed feed by appropriate weighing and metering systems.

DE 31 05 009 describes the fact that aqueous solutions of sodium or potassium methioninate have the same methionine activity as solid methionine when used as an animal feed additive.

However, a result of the low-temperature stability of methioninate solutions, which has to be guaranteed by suppliers, it has hitherto been possible to supply only solutions with a concentration of up 40 wt. % of methioninate. Thus commercial products contain up to about 60 wt. % of water which leads to an approximately 2.5-fold increase in transport costs as compared with the transport of solid methionine. This has prevented liquid supplements based on methionine penetrating the market.

The use of crystalline sodium methioninate has not been considered due to the strongly hygroscopic nature of this compound.

However, it would be very useful to provide an additive for animal feeds which satisfies the following requirements:

1. It has precisely the same nutritive efficacy as solid crystalline methionine.
2. It can be converted into a liquid form at the desired concentration by the feedstuff mixer itself, without having to handle, for example, alkalis.
3. As little as possible "dead volume" in the form of water is carried during transport, so that the active substance content of the transported material is high.
4. The product can be adapted to the specific requirements of the individual users and optionally may also be used as a solid.

SUMMARY OF THE INVENTION

In view of these problems, the object of the invention is to provide a process such that the problems listed above can be solved by the product obtained. The invention also provides a new and improved solid methioninate product for animal feed supplements.

The invention provides a process for preparing a free-flowing, easy to handle animal feed supplement based on methionine, in which the starting material is an aqueous methionine salt solution (methioninate solution) generally obtained in a conventional manner, which is characterised in that the methionine salt solution is converted into a granular material in one or more stages.

This process may be performed continuously or batchwise.

The solutions are generally 10 to 70 wt. % strength, preferably 20 to 60 wt. % strength, in particular 25 to 45 wt. % strength, with respect to methionine.

Sodium and/or potassium methioninate solutions are preferably used, wherein the molar ratio of methionine to K or Na ions is preferably 1.1:1 to 1:1.1, preferably 1:1.

It has also been found to be advantageous to first treat the solutions to be sprayed and/or granulated with active carbon.

In one embodiment the methionine salt solution is spray dried in a spray apparatus with a centrifugal atomiser, wherein the temperature difference between the inlet temperature (120–200° C.) and the outlet temperature (60–100°

C.) should be as large as possible. The powder obtained in this way is then converted into a granular material. This is achieved using a granulating plate, a granulating drum or a mixer. The granular mixture is preferably prepared in an Eirich mixer using an inserted, strongly shearing mixing device (cutter head insert).

The procedure in general is such that the spray dried powder is granulated in the mixing device together with a preferably saturated solution of the methionine salt.

The ratio by weight of powder to saturated solution, with respect to solid substance, is preferably in the range from 1:0.01 to 1:0.5.

The powder obtained by spray drying generally has a bulk density of 350 to 500 $kg/m^3$, and a dust fraction of at least 1 to 5% (Dr. Groschopp's dust test).

The granular material has a bulk density of greater than 650 $kg/m^3$, preferably greater than 700 $kg/m^3$ and a particle size distribution of 63 to 5000 $\mu m$, preferably 100 to 3000 $\mu m$, in particular 100 to 1400 $\mu m$, wherein about 90% has a particle size fraction >100 $\mu m$.

The proportion with a particle size <63 $\mu m$ is generally at most 2%, preferably 1%, the Dr Groschopp's dust fraction is <1%, preferably <0.5%.

Another process variant for preparing the granular material according to the invention is granulation in a fluidised bed. In this case spraying the sodium methioninate solution and building up the feed additive granular material is performed in only one process step. The fluidised reactor being used may contain one or more crushing devices to regulate the particle size.

Here again preferably saturated methioninate solutions are used although less concentrated solutions may also be used.

The increase in weight in the fluidised bed under steady state conditions is compensated for by continuous withdrawal of the granular material. By means of a specific mode of operation, a granular material with the desired particle size can be extracted from the discharge pipe, and this may optionally be passed through a cooling zone during discharge. The fine dust extracted with the drying air from the drying chamber is separated and returned to the granulation process as nuclei for the formation of granules. When preparing granular material according to the invention the temperature in the drying section of the fluidised bed is generally 100 to 200°.

Temperature management and optionally the use of one or more crushing devices in the fluidised bed determines the particle sizes which can be achieved. The preferred granular material with a particle size distribution between 63 and 5000 $\mu m$, preferably between 100 and 3000 $\mu m$, in particular between 100 and 1400 $\mu m$, wherein about 90% has a particle size greater than 100 $\mu m$, is produced according to the invention with the optional addition of additives. The dryer is designed, with respect to the amounts of air used (rate of flow of air), in such a way that on the one hand the granular material is not broken down and on the other hand fine dust is extracted below a given low particle size.

The granular material prepared in this way is preferably produced in the form of spheres and has a bulk density of >650 $kg/m^3$, preferably >700 $kg/m^3$ and a dust fraction of <1%, preferably <0.5% (Dr. Groschopp's dust test).

Other shaping processes, such as e.g. extrusion (Bextruder) may optionally be used to prepare granular material according to the invention. The equipment may then be connected in series with another process. Thus, for example, it is possible to combine an intensive mixer with a Bextruder and a fluidised bed drier both for continuous and batchwise processes.

In order to improve the ease of handling of the granular material being prepared it is recommended that the methionine salt solutions be sprayed and granulated in the presence of additives based on siliceous materials.

These include hydrophilic and hydrophobic silicas, of a pyrogenic nature or prepared by precipitation of 5 to 300 $m^2/g$ (sic), preferably spray dried silicas. Finely divided zeolites e.g. zeolite A or bentonites may also be used.

These additives may either be suspended in the solution being sprayed or preferably be introduced with the air stream into the equipment in which the solution is sprayed and optionally granulated.

The amount of other additives is 0.1 to 10 wt. %, preferably 0.1 to 5 wt. %, with respect to the granulated solid. Obviously these additive include, in addition to the siliceous compounds, preferred substances which are authorised for use in animal feedstuffs, in particular fatty acids and their salts, preferably alkali metal or alkaline earth salts.

The fatty acids include in particular stearic acid and palmitic acid and mixtures of fatty acids containing 16 to 18 carbon atoms or their above-mentioned salts.

Whereas non-granulated sodium methioninate cakes easily and loses its free-flowing properties due to its hygroscopic nature, unexpectedly this does not occur with the granular materials according to the invention. They remain free-flowing and easy to handle even when exposed to the weather and, in comparison to spray dried powders, exhibit obvious improvements to their properties with regard to:

a) free-flowing character and ease of handling
b) reduced dust content,
c) reduced tendency to cake when exposed to the weather
d) high bulk density.

Whereas spray dried products cake after being stored for 7 days at 55% relative humidity, granular material according to the invention remains free-flowing and easy to meter out.

The process according to the invention can be performed due only to the unexpected fact that methioninate does not decompose, even with inlet temperatures of more than 100° C., in the spray drier or equivalent apparatus.

Decomposition of these compounds, which is rendered obvious e.g. by the presence of yellow discoloration, would actually be expected due to the known instability of these compounds in the presence of alkalis.

These granular materials prepared for the first time are also subjects of the invention.

DETAILED DESCRIPTION OF THE PREFERRED EMBODIMENTS

Experimental section

Figure 1:
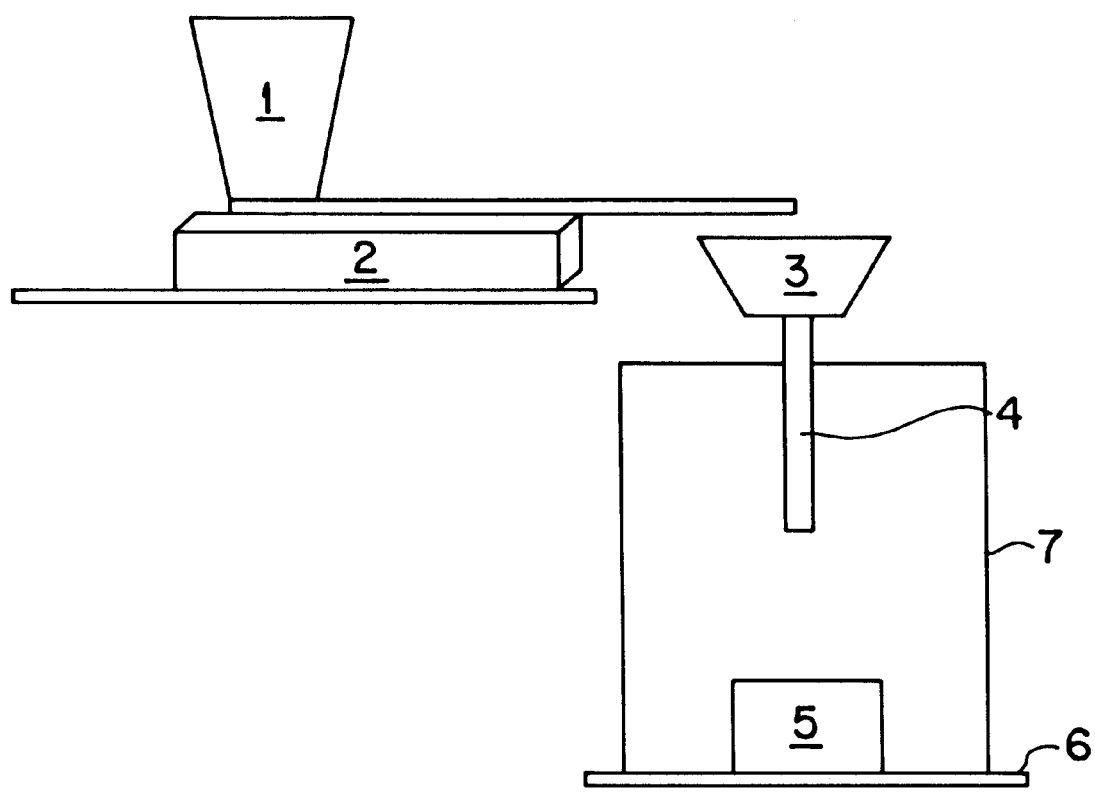
FIG. 1 shows, schematically, apparatus used for Dr. Groschopp's method of dust measurement.

To assess the granular materials according to the invention, the following tests were performed:

1. Hygroscopicity test

To assess the hygroscopicity at room temperature, the following atmospheric humidities were established in several desiccators ($\phi$160 mm) using saturated solutions (with excess solute present):

55% relative humidity: $Ca(NO_3)_2 \cdot 0.4H_2O$
76% relative humidity: NaCl 5 g of each test substance are distributed uniformly in a weighing bottle (φ50 mm) and the weighing bottles are stored open in the desiccator (at the desired humidity) at room temperature. The weighing bottles are taken out of the desiccator after 1, 2, 3, 5 and 7 days, assessed visually and the increase in weight recorded. In a few cases the water content can also be determined using a Karl-Fischer titration.

2. Caking test

Screen printing pads which have each been filled with 20 g of the particular test substance and are provided with an applied weight of 1.2 kg are each placed in a desiccator at room temperature at a relative humidity of 55 or 76% (established using saturated salt solutions, see point 1). After 3 days the compressed products obtained in this way are laid carefully in a horizontally-rotating roller sieve (55 rpm). After switching on the rotating sieve the abrasion time in seconds after which a defined amount (10 g) of abrasion has occurred on the roller sieve is determined (weight below the roller sieve). The shorter the abrasion time the lower the tendency to cake.

3. Dr. Groschopp's dust measurement 100 g of test substance are placed in the vibrating chute (2) via the feed funnel (1). The frequency of the vibrating chute is adjusted via the controller so that the powder flows slowly and uniformly into the funnel. The powder falls through the funnel (3) and inlet tube (4) into the inner cylinder (5) in the test apparatus which is placed underneath the funnel, while the dust falls outside this vessel onto the base plate (6) of the outer cylinder (7) (see FIG. 1).

After completing the addition of powder, the residues of powder remaining in the vibrating chute and in the funnel are transferred to the test apparatus using a brush. After a waiting time of 5 minutes, the dust deposited on the bright polished base plate is collected and weighed. The dust content is expressed as a percent with respect to the amount initially weighed out.

EXAMPLE

A spray dried sodium methioninate (NaMet; molar ratio Met:Na=1:1) was used for the granulation process wherein the methioninate solution was pre-treated with active carbon.

Analysis for NaMet (spray dried)
bulk density (kg/m$^3$) 500
compacted density (kg/m$^3$) 600
particle size distribution (%)<200 μm >90%
dust fraction (%) approx.=4
(Dr. Groschopp's dust test, FIG. 1: dust test equipment)

The spray dried product is granulated in an Eirich mixer under the following conditions (table 1):

TABLE 1

Granulating conditions in the Eirich mixer

| Product | Granulate A | Granulate B |
|---|---|---|
| Weight of NaMet (spray dried) used [kg] | 2.5 | 1.66 (+83 g stearic acid as additive) |
| Volume of granulating liquid [ml] Liquimeth (60% Met) | 530 | 390 |
| Speed of fluidiser (rpm) | 3000 | 3000 |

The general handling properties of the granular material were checked (table 2).

TABLE 2

Handling properties of the granular material

| Product | Granulate A | Granulate B |
|---|---|---|
| Bulk density (kg/m$^3$) | 740 | 800 |
| Compacted density (kg/m$^3$) | 840 | 900 |
| Particle size distribution (%) | | |
| <100 μm | 7 | 9 |
| 100–500 μm | 51 | 53 |
| 500–1000 μm | 23 | 23 |
| 1000–1400 μm | 6 | 5 |
| 1400–3150 μm | 9 | 8 |
| 3150–5000 μm | 4 | 2 |
| Dust fraction (%) | 0.2 | 0.1 |

Data on the hygroscopic characteristics and tendency to cake of sodium methioninate in the spray dried and granular form respectively are particularly relevant (see table 3).

When comparing the various product forms it can be seen that a much smaller increase in weight (equal to absorption of water) takes place with granular material. The differences between spray dried product and granules is particularly noticeable at a relative humidity of 55%. With a relative humidity of 76% (although the numerical differences are smaller) the visual appearance of the granular form is much better.

Increases in weight of up to about 18% produce a thicker or thinner surface incrustation on the product. Whereas in the case of the granular material a short, sharp blow to the glass vessel was sufficient to obtain a free-flowing product, the spray dried powder had to be crushed after "weathering" in order to obtain a free-flowing material.

This subjective impression is also confirmed by the results on assessing the tendency to cake (table 3). The lower tendency to cake of sodium methioninate in granular form is clearly demonstrated by the shorter abrasion times.

TABLE 3

Hygroscopicity and tendency to cake of sodium methioninate in the spray dried form and as a granular material.

| Product | NaMet (spray dried) | Granulate A | Granulate B |
|---|---|---|---|
| 55% relative humidity | | | |
| Increase in weight (%) after | | | |
| 1 day | 8.4 | 5.8 | 4.0 |
| 2 days | 11.8 | 6.7 | 4.6 |
| 3 days | 12.1 | 7.1 | 5.3 |
| 4 days | 11.4 | 7.7 | 5.4 |
| 5 days | 13.4 | 7.8 | 5.6 |
| Tendency to cake Abrasion time (s) | 60 | 20 | 13 |
| 76% relative humidity | | | |
| Increase in weight (%) after | | | |
| 1 day | 12.4 | 10.1 | 8.9 |

TABLE 3-continued

Hygroscopicity and tendency to cake of sodium methioninate in the spray dried form and as a granular material.

| Product | NaMet (spray dried) | Granulate A | Granulate B |
| --- | --- | --- | --- |
| 2 days | 17.7 | 13.6 | 11.4 |
| 3 days | 23.6 | 15.0 | 14.5 |
| 4 days | 25.7 | 26.3 | 24.7 |
| 5 days | 31.0 | 33.6 | 31.2 |
| Tendency to cake Abrasion time (s) | 295 | 145 | 147 |

What is claimed is:

1. A process for preparing a free-flowing, animal feed supplement based on an alkali metal or an alkaline earth metal other than calcium methionine salt, comprising the steps of:
   (a) spray drying an alkali metal or alkaline earth metal methionine salt solution to obtain a powder, and
   (b) converting such powder into a granular material,
wherein either step (a) or step (b) can be carried out in the presence of additives based on siliceous material.

2. The process according to claim 1, wherein the steps of spray drying and granulating the alkali metal or alkaline earth metal methionine salt solution are carried out simultaneously in a fluidized bed.

3. The process according to claim 1, comprising:
converting the alkali metal or alkaline earth metal methionine salt solution into a granular material by a shaping process.

4. The process according to claim 3 comprising:
shaping the granular material by extrusion.

5. The process according to claim 4, comprising:
combining the extrusion shaping with an intensive mixer.

6. The process according to claim 4, comprising:
combining the extrusion shaping with drying in a fluidized bed drier.

7. The process according to claim 1, further comprising:
treating the alkali metal or alkaline earth metal methionine salt solution with active carbon before granulation.

8. The process according to claim 1, further comprising:
treating the alkali metal or alkaline earth metal methionine salt solution with active carbon before spray drying.

9. The process according to claim 1, wherein the additive comprises a hydrophilic or hydrophobic silica, prepared by precipitation or of a pyrogenic nature, in an amount of 0.1 to 10 wt. %, with respect to solids.

10. The process according to claim 1, wherein the additive comprises finely divided zeolite or bentonite in an amount of 0.1 to 10 wt. % with respect to solids.

11. The process according to claim 1, wherein the additive comprises at least one member selected from the group consisting of fatty acids, alkali metal salts thereof and alkaline earth metal salts thereof in an amount of 0.1 to 10 wt. %, with respect to solids.

12. The process according to claim 1, comprising:
using a 10 to 70% strength alkali metal or alkaline earth metal methionine salt solution, with respect to a methionine base.

13. The process according to claim 12, wherein a 25 to 50% strength alkali metal or alkaline earth metal methionine salt solution is used.

14. The process according to claim 1, wherein the alkali metal or alkaline earth metal methionine salt solution comprises at least one member selected from the group consisting of sodium methioninate and potassium methioninate.

15. The process according to claim 14, wherein a sodium methioninate solution is used.

16. The process according to claim 1, wherein a powder with a bulk density in the range of 350 to 500 $kg/m^3$ and a dust fraction in the range of 1 to 5% is obtained after spray drying step (a).

17. The process according to claim 16, wherein the spray dried powder is granulated together with a saturated solution of the alkali metal or alkaline earth metal methionine salt in a mixer with a strong shear action.

18. The process according to claim 17, wherein the ratio by weight of powder to saturated solution of alkali metal or alkaline earth metal methioninate, with respect to solid substance, is in the range from 1:0.01 to 1:0.5.

19. The process according to claim 1, wherein granulating step (b) is carried out in a fluidized bed, optionally with inserted crushing devices.

20. An alkali metal or an alkaline earth metal other than calcium methioninate granular material which is free-flowing, having:
   a) a bulk density of >650 $kg/m^3$,
   b) a particle size distribution of 63 to 5000 $\mu m$,
   c) a dust content of <1%.

* * * * *